(12) United States Patent  
Katoh et al.

(10) Patent No.: US 12,325,084 B2  
(45) Date of Patent: Jun. 10, 2025

(54) FRICTION STIR WELDING ATTACHMENT, FRICTION STIR WELDING HEAD, AND FRICTION STIR WELDING DEVICE

(71) Applicant: SHIBAURA MACHINE CO., LTD., Tokyo (JP)

(72) Inventors: Kouichi Katoh, Shizuoka (JP); Hirohiko Matsuzaki, Shizuoka (JP); Toshinao Aoki, Shizuoka (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 22 days.

(21) Appl. No.: 18/272,000

(22) PCT Filed: Dec. 24, 2021

(86) PCT No.: PCT/JP2021/048435  
§ 371 (c)(1),  
(2) Date: Jul. 12, 2023

(87) PCT Pub. No.: WO2022/153851  
PCT Pub. Date: Jul. 21, 2022

(65) Prior Publication Data  
US 2024/0066622 A1 Feb. 29, 2024

(30) Foreign Application Priority Data  
Jan. 15, 2021 (JP) ................. 2021-005049

(51) Int. Cl.  
*B23K 20/00* (2006.01)  
*B23K 20/12* (2006.01)  
*B23Q 5/04* (2006.01)

(52) U.S. Cl.  
CPC .......... *B23K 20/121* (2013.01); *B23K 20/125* (2013.01); *B23Q 5/04* (2013.01)

(58) Field of Classification Search  
CPC .......... B23K 20/125; B23Q 5/06; B23Q 5/04; B23B 39/10; B23B 47/00; B23B 39/00; B23C 1/06; B27C 5/00  
See application file for complete search history.

(56) References Cited

U.S. PATENT DOCUMENTS 3,034,549 A * 5/1962 Quackenbush .......... B23Q 5/54  
144/134.1  
6,302,315 B1 10/2001 Thompson  
(Continued)

FOREIGN PATENT DOCUMENTS

JP H10305372 A 11/1998  
JP 2004-105975 4/2004  
(Continued)

OTHER PUBLICATIONS

International Preliminary Report on Patentability for International Application No. PCT/JP2021/048193, mailed Jul. 27, 2023, 9 pages.  
(Continued)

*Primary Examiner* — Erin B Saad  
(74) *Attorney, Agent, or Firm* — DLA Piper LLP (US)

(57) ABSTRACT

A friction stir welding attachment includes a body configured to be attached to a spindle supported by a spindle head of a machine tool, a metalworking shaft rotatably supported by the body wherein a welding tool is attachable to the metalworking shaft, a plurality of air motors provided in the body, and a transmission mechanism configured to transmit a rotation of each of the plurality of air motors to the metalworking shaft. A fixing portion is provided to supply external air to the plurality of air motors. A drive air distributor is provided to distribute drive air to the air motors. A rotation sensor for detecting a rotation state is provided to the metalworking shaft.

20 Claims, 8 Drawing Sheets

(56) References Cited

U.S. PATENT DOCUMENTS

| | | | |
|---|---|---|---|
| 6,367,681 B1* | 4/2002 | Waldron | B23K 20/123 |
| | | | 228/2.1 |
| 7,028,880 B2 | 4/2006 | Narita et al. | |
| 7,264,426 B2* | 9/2007 | Buttrick, Jr. | B23Q 5/385 |
| | | | 408/1 R |
| 7,404,512 B2 | 7/2008 | Baumann et al. | |
| 7,490,750 B2 | 2/2009 | Trapp et al. | |
| 7,992,761 B2 | 8/2011 | Baumann et al. | |
| 8,047,242 B2* | 11/2011 | Wall | B25F 5/001 |
| | | | 408/710 |
| 9,205,533 B2 | 12/2015 | Matlack et al. | |
| 11,813,692 B2 | 11/2023 | Okada et al. | |
| 2002/0190100 A1 | 12/2002 | Duncan | |
| 2004/0129763 A1 | 7/2004 | Burford et al. | |
| 2005/0189127 A1* | 9/2005 | Martin | B23B 45/003 |
| | | | 173/1 |
| 2006/0102689 A1 | 5/2006 | Trapp et al. | |
| 2008/0084018 A1* | 4/2008 | Baumann | B23Q 3/16 |
| | | | 269/271 |
| 2008/0112768 A1* | 5/2008 | Matlack | B23Q 3/16 |
| | | | 408/1 BD |
| 2009/0067939 A1* | 3/2009 | Carr | B23Q 5/265 |
| | | | 408/4 |
| 2010/0143057 A1* | 6/2010 | Breese | B23B 39/00 |
| | | | 408/124 |
| 2010/0176106 A1 | 7/2010 | Christensen et al. | |
| 2010/0232894 A1 | 9/2010 | Burton et al. | |
| 2011/0255930 A1* | 10/2011 | Eriksson | B23Q 17/0966 |
| | | | 408/137 |
| 2013/0255884 A1* | 10/2013 | Baumann | B32B 38/18 |
| | | | 228/2.1 |
| 2015/0097021 A1 | 4/2015 | Persson | |
| 2015/0143686 A1* | 5/2015 | Blacket | F16D 57/002 |
| | | | 29/243.526 |
| 2015/0219521 A1* | 8/2015 | Clew | B21J 15/36 |
| | | | 73/40.7 |
| 2016/0214204 A1* | 7/2016 | Comfort | B23K 20/1225 |
| 2017/0151626 A1* | 6/2017 | Larsson | B23K 20/126 |
| 2017/0297143 A1 | 10/2017 | Saito et al. | |
| 2017/0361394 A1* | 12/2017 | Bartos | B23K 20/1245 |
| 2018/0161915 A1* | 6/2018 | Smitherman | B23K 20/127 |
| 2021/0146490 A1* | 5/2021 | Zheng | B23B 39/00 |
| 2021/0178528 A1 | 6/2021 | Kloepfer et al. | |
| 2022/0009024 A1 | 1/2022 | Yoshikawa et al. | |
| 2022/0134471 A1 | 5/2022 | Okada et al. | |
| 2023/0047903 A1 | 2/2023 | Price et al. | |
| 2024/0017334 A1* | 1/2024 | Watford | B23B 47/32 |
| 2024/0066622 A1* | 2/2024 | Katoh | B23K 37/0241 |
| 2024/0082946 A1* | 3/2024 | Katoh | B23K 20/125 |
| 2024/0116130 A1* | 4/2024 | Katoh | B23K 37/027 |

FOREIGN PATENT DOCUMENTS

| | | |
|---|---|---|
| JP | 2000-7000876 | 1/2007 |
| JP | 2009-166204 | 7/2009 |
| JP | 2017-127881 | 7/2017 |
| JP | 2019195889 | 11/2019 |
| JP | 2021-171776 | 11/2021 |

OTHER PUBLICATIONS

International Search Report and Written Opinion for International Application No. PCT/JP2021/048193, mailed Mar. 15, 2022, 11 pages.

International Preliminary Report on Patentability for International Application No. PCT/JP2021/048435, mailed Jul. 27, 2023, 9 pages.

International Search Report and Written Opinion for International Application No. PCT/JP2021/048435, mailed Mar. 15, 2022, 11 pages.

U.S. Appl. No. 18/271,997, filed Dec. 9, 2024.

* cited by examiner

FRICTION STIR WELDING ATTACHMENT, FRICTION STIR WELDING HEAD, AND FRICTION STIR WELDING DEVICE

CROSS REFERENCE TO RELATED APPLICATIONS

This application is a U.S. National Stage Application of International Application No. PCT/JP2021/048435 filed Dec. 24, 2021, which claims priority from Japanese Patent Application No. 2021-005048 filed Jan. 15, 2021. The entirety of all the above-listed applications are incorporated herein by reference.

TECHNICAL FIELD

The present invention relates to a friction stir welding attachment, a friction stir welding head, and a friction stir welding machine.

BACKGROUND ART

It has been known to attach a friction stir welding tool to a general-purpose machine tool for use as a friction stir welding machine (see JP 2017-127881 A, referred to herein as "Patent Literature 1").

A rotation axis of the welding tool of the above-mentioned Patent Literature 1 is vertically arranged with respect to a surface of a workpiece to be welded. In contrast, it has been proposed to slant the rotation axis of the welding tool so that a distal end of the welding tool is offset toward a front side in a movement direction to enhance performance for the welding tool to penetrate a workpiece and to retain a softened material in position.

The slanted attitude of the rotation axis of the welding tool can be achieved by: providing a slant mechanism including a flexible joint to a friction stir welding attachment, to which a welding tool or a friction stir welding head including the welding tool is attachable; or by adjusting an attitude of a spindle of a machine tool so that the spindle is slanted.

SUMMARY OF THE INVENTION

In the above-described Patent Literature 1, a joint line, along which a rotary welding tool is moved to perform friction stir welding on materials, is linear.

Meanwhile, it is desired that friction stir welding is performed on objects of a more complicated shape. For instance, it is desired that friction stir welding is performed along a joint line that is bent halfway or is curved.

However, the above-described slanted welding tool cannot be directly used for friction stir welding along the bent or curved joint line.

Specifically, when friction stir welding is to be performed along a bent or curved joint line, naturally, the rotary welding tool is moved along the joint line. For instance, when friction stir welding is to be performed along a joint line extending in an X-axis direction, the welding tool is moved in the X-axis direction with the rotation axis of the welding tool being slanted in the X-axis direction.

Supposing that the joint line is perpendicularly bent, though the movement direction of the welding tool can be easily changed by an operation program, the slanted attitude of the rotation axis of the welding tool cannot be changed. Consequently, the rotation axis of the welding tool is dis- advantageously kept slanted in the X-axis direction when the welding tool is moved in a direction orthogonal to the X axis.

In order to avoid such a disadvantage, it has been desired that the slant direction, in addition to the movement direction, of the welding tool can be easily changed.

Further, in addition to friction stir welding on an upper side of a workpiece, it has been desired that friction stir welding is also performed on a lateral side of the workpiece. In order to perform friction stir welding on the lateral side, the spindle is positioned to squarely face the lateral side or, alternatively, an angle head and the welding tool are attached to a vertical spindle to change the direction of the welding tool depending on the direction of the lateral side. However, complicated position control of the machine tool or the like is necessary in order to change the direction of the spindle or the angle head.

It has thus been desired that the direction of the angle head can be easily changed when friction stir welding is performed on a lateral side of a workpiece.

In order to easily change the above-described slant direction of the welding tool or the direction of the angle head, the present applicant has developed a friction stir welding attachment, a friction stir welding head, a friction stir welding machine, and a friction stir welding method that are capable of changing the direction by a spindle (JP 2020-075490 A).

The friction stir welding attachment in this disclosure includes: a body attached to a spindle of a machine tool; a metalworking shaft rotatably supported by the body, to which a welding tool is attachable; and a rotation drive unit configured to rotate the metalworking shaft. In this arrangement, the rotation of the spindle can be used to change the direction of the body since the rotation of the welding tool is performed by the rotation drive unit.

In this disclosure, the rotation drive unit is an air motor configured to be rotated by air supplied through a axial center of the spindle.

However, the drive of the air motor is often not sufficient to produce rotary torque required for the welding tool. Thus, some improvement is necessary in order to perform stable friction stir welding.

In addition, the air motor, whose torque fluctuates depending on the flow rate of the air, cannot stabilize the torque only by adjusting the flow rate of the air supplied in order to control the air motor.

An object of the invention is to provide a friction stir welding attachment, a friction stir welding head, and a friction stir welding machine that are capable of producing sufficient torque in driving a welding tool with an air motor(s).

Another object of the invention is to provide a friction stir welding attachment, a friction stir welding head, and a friction stir welding machine that are capable of producing stable torque in driving a welding tool with an air motor(s).

A friction stir welding attachment according to an aspect of the invention includes: a body to be attached to a spindle supported by a spindle head of a machine tool; a metalworking shaft rotatably supported by the body, a welding tool being attachable to the metalworking shaft; a plurality of air motors provided in the body; and a transmission mechanism configured to transmit a rotation of each of the plurality of air motors to the metalworking shaft.

According to the above arrangement, torques of the plurality of air motors can be combined by the transmission mechanism to be transmitted to the metalworking shaft. Accordingly, even when the torque of each of the air motors is not sufficiently large, sufficient torque can be given to the welding tool. Especially, the torque for the welding tool can be further increased by increasing the number of the air motors as necessary.

In addition, since the torque of the welding tool can be increased by providing the plurality of air motors in the above aspect of the invention, it is not necessary to reduce the speed of the air motors in order to increase the torque. Accordingly, speed-up at the transmission mechanism and, consequently, increase in the rotation speed of the welding tool can be achieved.

In the friction stir welding attachment according to the above aspect of the invention, it is preferable that the air motors are symmetrically located with respect to the metalworking shaft, and the transmission mechanism includes a center gear connected with the metalworking shaft and a plurality of motor gears connected with the air motors and engaged with an outer circumference of the center gear.

According to the above arrangement, the weight of the body around the metalworking shaft can be easily balanced and torque of the transmission mechanism can be also balanced.

The friction stir welding attachment according to the above aspect of the invention preferably further includes: a drive air distributor provided in the body and configured to distribute an externally supplied drive air to the plurality of air motors, a flow rate of the drive air being adjustable by the drive air distributor in response to an external signal.

According to the above arrangement, the drive air through a single channel can be shared by the plurality of air motors and the rotation state of the air motors can be controlled by an external controller.

In the friction stir welding attachment according to the above aspect of the invention, it is preferable that the drive air is center through air supplied through the spindle.

According to the above arrangement, the mechanism for supplying the drive air can be simplified.

The friction stir welding attachment according to the above aspect of the invention preferably further includes: a fixing portion rotatably provided around an outer circumference of the body, the fixing portion being connectable to the spindle head, in which the drive air is preferably external air supplied through the spindle head and the fixing portion.

According to the above arrangement, the drive air whose flow rate exceeds a limit of the flow rate of the center through air through the spindle can be supplied. Further, even if the machine tool has no mechanism for supplying the center through air, the invention is applicable to the machine tool simply by installing an air supply pipe in the spindle head.

In the above aspect of the invention, the drive air is optionally a combination of external air and the center through air.

The friction stir welding attachment according to the above aspect of the invention preferably further includes a rotation sensor configured to detect a rotation state of the metalworking shaft or the air motors.

According to the above arrangement, the rotation state and the torque of the welding tool can be stabilized by detecting the rotation state and feeding back the detection results to control the flow rate of the drive air.

The rotation sensor according to the above aspect of the invention is selectable from among any existing devices such as rotary encoders, angle sensors, and rotation counters. It is only necessary to detect the rotation of one of the air motors because the air motors and the metalworking shaft are coupled via the transmission mechanism.

In the friction stir welding attachment according to the above aspect of the invention, it is preferable that the metalworking shaft is aligned with a direction intersecting an axis line of the spindle.

According to the above arrangement, the metalworking shaft and the welding tool can be supported, for instance, in a horizontal direction by attaching the metalworking shaft and the welding tool to the vertically arranged spindle, thereby allowing friction stir welding to be performed on a lateral side of a workpiece. Further, the direction of the metalworking shaft and the welding tool can be changed by changing the direction of the body using the spindle.

In the friction stir welding attachment according to the above aspect of the invention, it is preferable that the metalworking shaft, which is aligned with the direction intersecting the axis line of the spindle, is arranged so that a metalworking portion of the welding tool is located on the axis line of the spindle when the welding tool is attached to the metalworking shaft.

According to the above arrangement, irrespective of the direction of the spindle and the welding tool, the metalworking portion of the welding tool can constantly be kept on the axis line of the spindle. The metalworking position on the workpiece can thus be easily set irrespective of the direction of the welding tool and, for instance, a control program can be also easily made.

In the friction stir welding attachment according to the above aspect of the invention, it is preferable that the metalworking shaft is coaxial with an axis line of the spindle.

According to the above arrangement, the direction of the metalworking shaft and the welding tool (e.g. the direction for the welding tool to be slanted) can be changed to any direction by changing the direction of the body using the spindle.

Further, the position of the welding tool on the metalworking shaft coaxial with the axis line of the spindle and the position of the welding tool directly attached to the spindle, which are only different in the direction of the axis line, are the same with respect to the surface of the workpiece. Accordingly, the control program for the welding tool directly attached to the spindle can be converted to be used only after minimum modification (e.g. changing numerical values in the axis line direction).

A friction stir welding head according to another aspect of the invention includes: the friction stir welding attachment according to the above aspect of the invention; and the welding tool attached to the friction stir welding attachment.

The above aspect of the invention can achieve the same advantages as those of the friction stir welding attachment according to the above-described aspect of the invention.

A friction stir welding machine according to still another aspect of the invention includes: the friction stir welding attachment according to the above aspect of the invention; the welding tool attached to the friction stir welding attachment; and the machine tool attached with the friction stir welding attachment.

The above aspect of the invention can achieve the same advantages as those of the friction stir welding attachment according to the above-described aspect of the invention.

According to the above aspects of the invention, a friction stir welding attachment, a friction stir welding head, and a friction stir welding machine that are capable of producing sufficient torque in driving a welding tool with an air motor(s) can be provided.

DESCRIPTION OF EMBODIMENT(S)

First Example Embodiment

Figure 1:
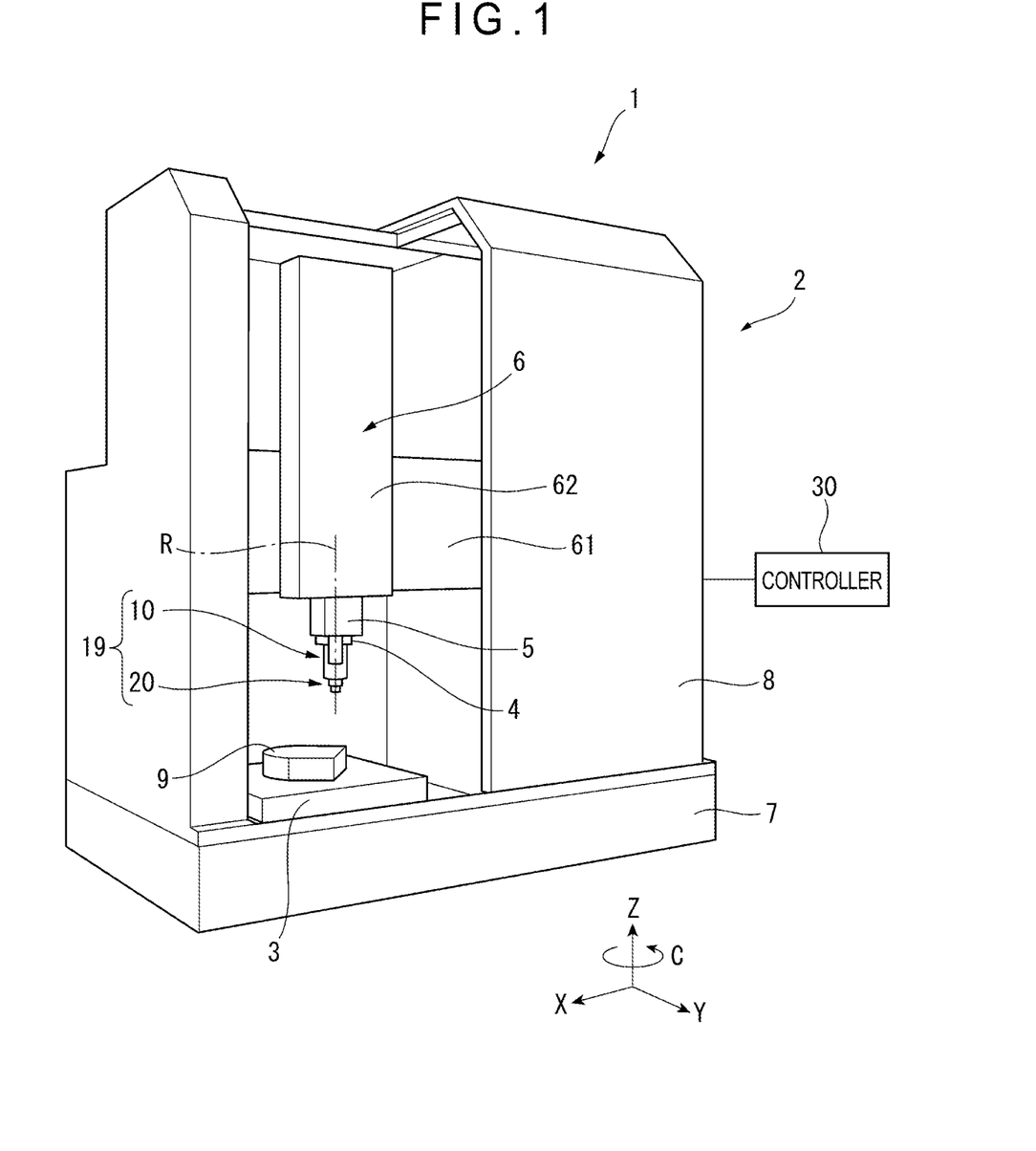
FIG. 1 is a perspective view depicting a machine tool according to a first example embodiment of the invention.

As depicted in FIG. 1, a friction stir welding machine 1 of the present example embodiment is provided by attaching a friction stir welding attachment 10 according to the invention and a general-purpose welding tool 20 for friction stir welding to a general-purpose machine tool 2 having a vertical spindle. A friction stir welding head 19 of the invention is constructed by the friction stir welding attachment 10 and the welding tool 20.

The machine tool 2 includes: a table 3, on which a workpiece 9 is to be fixed; a spindle 4 having a distal end to which a tool is attachable; a spindle head 5 supporting the spindle 4 so that the spindle 4 is rotatable; and a moving mechanism 6 configured to move the spindle head 5 to a desired position.

The moving mechanism 6 includes a slider 62 supported by a horizontal guide bar 61. The spindle head 5 is supported by the slider 62 in a manner extending downward. The spindle head 5, which is moved up and down with respect to the slider 62, is configured to move the distal end of the spindle 4 to a desired position in a Z axis direction. Further, the slider 62, which is moved along the guide bar 61, is configured to move the distal end of the spindle 4 to a desired position in an X axis direction.

The spindle 4, whose axis line R extends vertically (i.e. in the Z axis direction), is rotatable around the axis line R by a drive motor in the spindle head 5 (a rotary operation Rs in a C axis direction) and is stoppable at a desired angle position.

The friction stir welding head 19 is attached to the spindle 4. In other words, the welding tool 20 is attached to the spindle 4 through the friction stir welding attachment 10.

The table 3 is rotatable around a vertical axis line (i.e. in the C axis direction) and is stoppable at a desired angle position by a drive mechanism installed in the bed 7.

The table 3, spindle 4, spindle head 5 and moving mechanism 6 are optionally entirely surrounded by a cover 8 that is provided on an upper side of the bed 7 and configured to be opened/closed.

A controller 30, which uses a computer system, is connected to the machine tool 2 to control the movement of the moving mechanism 6 and the rotation of the spindle 4.

Figure 2:
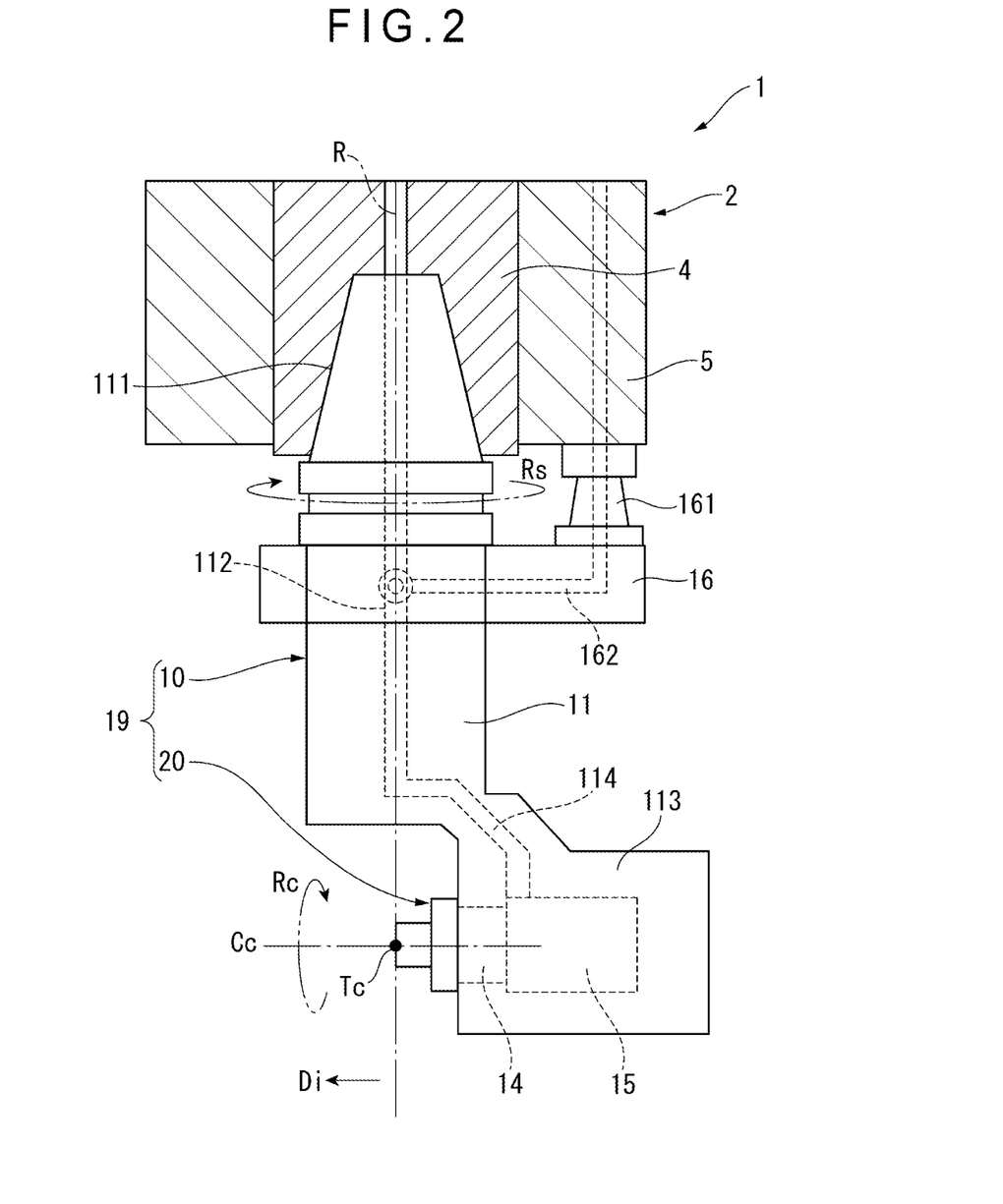
FIG. 2 is an illustration depicting a friction stir welding attachment of the first example embodiment.

As depicted in FIG. 2, the friction stir welding attachment 10 includes: a body 11 to be attached to the spindle 4 of the machine tool 2; a metalworking shaft 14 supported in a rotatable manner, to which the welding tool 20 is attachable at an end thereof; a rotation drive unit 15 configured to rotate the metalworking shaft 14; and a fixing portion 16 configured to be connected with the spindle head and rotatably provided around the body 11.

The body 11, which is configured to be attached to the spindle 4 through a standard-compliant tapered shank 111, has a center through hole 112 extending along an axial center thereof. Center through air can be supplied into the center through hole 112 from the spindle 4.

The body 11 is provided with an extension part 113 extending in a direction intersecting the axis line R at a part remote from the tapered shank 111. Drive air can be supplied to the rotation drive unit 15 through the center through hole 112 and an extension air channel 114, which is in communication with the center through hole 112 and is provided in the extension part 113.

The metalworking shaft 14, which is provided at a side of the extension part 113 facing the axis line R, is rotatable around an axis line Cc intersecting the axis line R (rotary operation Rc). An end Tc (metalworking portion) of the welding tool 20 attached to the metalworking shaft 14 is positioned on the axis line R.

The rotation drive unit 15, which includes a plurality of air motors configured to be rotated by externally supplied drive air, is configured to rotate the metalworking shaft 14. Details of the rotation drive unit 15 will be described later.

The fixing portion 16 includes a sub shank 161 at an end remote from the body 11. The fixing portion 16 is connectable to the spindle head 5 through the sub shank 161.

An external air channel 162 is formed in the fixing portion 16. External air is supplied from the spindle head 5 into the external air channel 162 through the sub shank 161. An opposite end of the external air channel 162 is connected to the center through hole 112, so that the external air from the spindle head 5 is combined with the center through air from the spindle 4 to be supplied to the rotation drive unit 15.

In the friction stir welding attachment 10 of the present example embodiment, the center through air is supplied from the spindle 4 to the rotation drive unit 15 through the center through hole 112 to effect the rotation of the metalworking shaft 14 and the welding tool 20 by the rotation drive unit 15 (rotary operation Rc), thereby performing friction stir welding on a lateral side or the like of the workpiece 9 by the welding tool 20.

In addition, a direction Di of the welding tool 20 can be changed depending on the direction of the lateral side of the workpiece 9 by rotating the body 11 (rotary operation Rs) by the spindle 4. Even when the body 11 is rotated by the spindle 4, the fixing portion 16, which cannot be rotated by the presence of the sub shank 161, is fixed with respect to the spindle head 5.

Figure 3:
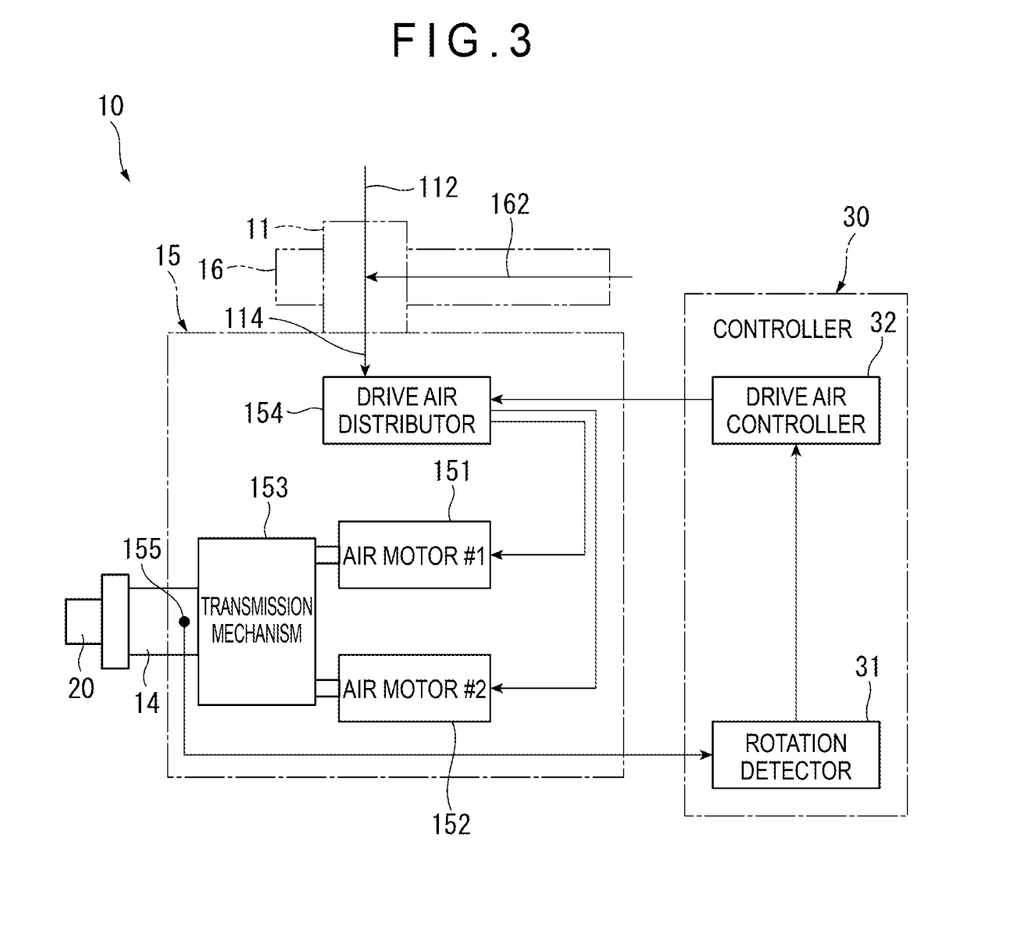
FIG. 3 is an illustration depicting a rotation drive unit and a controller for the friction stir welding attachment of the first example embodiment.

As depicted in FIG. 3, the rotation drive unit 15 includes a plurality of (e.g. two) air motors 151, 152, a transmission mechanism 153, a drive air distributor 154 configured to distribute the drive air supplied through the extension air channel 114 to the air motors 151, 152, and a rotation sensor 155 configured to detect a rotation state of the metalworking shaft 14.

The air motors 151, 152, which are pressure motors configured to convert the pressure of the supplied external air to torque (rotary power), are preferably, for instance, vane or turbine motors capable of relatively high-speed rotation. However, the air motors 151, 152 are alternatively a different type of motors (e.g. radial piston motors).

The transmission mechanism 153, which is configured to transmit the rotation of the air motors 151, 152 to the metalworking shaft 14, is, for instance, in a form of a meshing gear mechanism.

Figure 4:
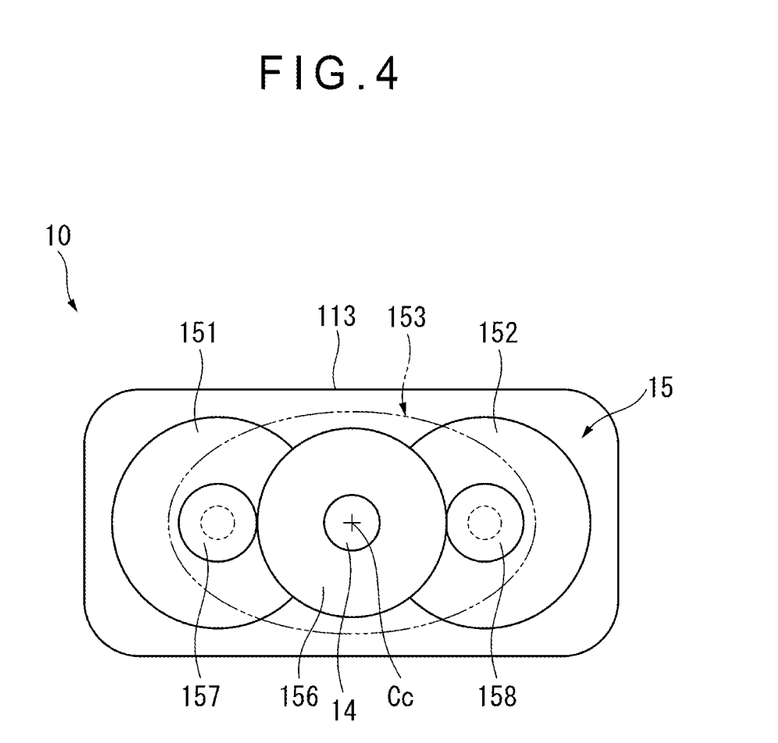
FIG. 4 is an illustration depicting a transmission mechanism of the friction stir welding attachment of the first example embodiment.

As depicted in FIG. 4, the air motors 151, 152 are symmetrically arranged in parallel across the axis line Cc of the metalworking shaft 14. A center gear 156 is fixed to the metalworking shaft 14. Motor gears 157, 158 are fixed to rotation axes of the air motors 151, 152, respectively. The motor gears 157, 158 are engaged with mutually opposite sides of the center gear 156.

Thus, the torques of the air motors 151, 152, which are transmitted through the motor gears 157, 158 to the center gear 156, are combined to be consumed as a torque for the metalworking shaft 14.

The transmission mechanism 153 is constructed by the center gear 156 and the motor gears 157, 158.

The drive air distributor 154, which includes, for instance, an opening-degree control valve whose flow rate is controllable by an external signal, is configured to distribute the drive air supplied through the extension air channel 114 to the air motors 151, 152 and independently control the flow rate of the drive air to the air motors 151, 152.

The rotation sensor 155, which is provided by an optical counter(s) and/or a rotary encoder(s) provided at position(s) facing a circumferential surface of the metalworking shaft 14, is configured to detect a rotation state of the metalworking shaft 14 and output the rotation state in a form of an external signal.

The controller 30 is provided with a rotation detector 31 configured to detect a rotation speed of the metalworking shaft 14 based on the signal outputted by the rotation sensor 155.

The controller 30 is also provided with a drive air controller 32, which is configured to control the flow rate of the drive air to be distributed by the drive air distributor 154 depending on a metalworking operation performed on the workpiece 9. At this time, the drive air controller 32 controls the drive air distributor 154 so that the welding tool 20 will rotate as desired for the metalworking operation with reference to the rotation speed detected by the rotation detector 31.

The metalworking shaft 14 and the welding tool 20 can be stably rotated by the rotation drive unit 15 at desired conditions by virtue of the presence of the drive air controller 32 and the rotation detector 31.

The following advantages can be achieved by the friction stir welding attachment 10, the friction stir welding head 19, and the friction stir welding machine 1 according to the present example embodiment.

In the present example embodiment, the torques of the plurality of (two) air motors 151, 152 can be combined to be transmitted to the metalworking shaft 14 by the transmission mechanism 153. Accordingly, even when the torque of each of the air motors 151, 152 is not sufficiently large, sufficient torque can be given to the welding tool 20. The number of the air motors 151, 152, which is two in the present example embodiment, can be increased as necessary to multiply the torque of the welding tool 20.

In addition, since the torque of the welding tool 20 can be increased by providing the plurality of air motors 151, 152 in the present example embodiment, it is not necessary to increase the torque by reducing the speed of the air motors. Accordingly, speed-up at the transmission mechanism 153 and, consequently, increase in the rotation speed of the welding tool 20 can be achieved.

In the present example embodiment, the two air motors 151, 152 are symmetrically arranged with respect to the metalworking shaft 14 and the transmission mechanism 153 is provided by the center gear 156 connected to the metalworking shaft 14 and the plurality of motor gears 157, 158, which are connected to the air motors 151, 152 and engaged with the outer circumference of the center gear 156. Accordingly, the weight balance at the rotation drive unit 15 in the extension part 113 of the body 11 around the metalworking shaft 14 can be easily achieved and the torque of the transmission mechanism 153 can be also balanced.

In the present example embodiment, the drive air distributor 154 capable of controlling the flow rate of the externally supplied drive air in response to an external signal is provided to distribute the drive air to the plurality of air motors 151, 152. Accordingly, the drive air flowing through the extension air channel 114 (single channel) can be shared between the plurality of air motors 151, 152. In addition, the rotation state of the air motors 151, 152 can be controlled by the drive air controller 32, which is a part of the external controller 30.

In the present example embodiment, the drive air is a combination of the center through air supplied through the spindle 4 and the external air supplied from the spindle head 5 through the fixing portion 16. With the above arrangement, the structure for supplying the drive air can be simplified by the use of existing center through air. In addition, the drive air, whose flow rate exceeds a limit of the flow rate of the center through air, can be supplied by the use of the external air from the fixing portion 16.

Further, even if the machine tool 2 has no mechanism for supplying the center through air, the invention is applicable to the machine tool 2 simply by installing an air supply pipe in the spindle head 5.

The presence of the rotation sensor 155 for detecting the rotation state of the metalworking shaft 14 in the present example embodiment can stabilize the rotation state and torque of the welding tool 20 by detecting the rotation state of the metalworking shaft 14 and feeding back the detection results to control the flow rate of the drive air to the air motors 151, 152.

In the present example embodiment, the metalworking shaft 14 is aligned with a direction intersecting the axis line R of the spindle 4 (i.e. in the direction of the axis line Cc). Accordingly, the metalworking shaft 14 and the welding tool 20 can be supported in the horizontal direction (XY-plane direction) by attaching the metalworking shaft 14 and the welding tool 20 to the spindle 4 aligned in the vertical direction (Z axis direction), so that friction stir welding can be performed on a lateral side of the workpiece 9. Further, the direction Di of the metalworking shaft 14 and the welding tool 20 can be changed by changing the direction of the body 11 using the spindle 4.

In the present example embodiment, the metalworking shaft 14, which is aligned with the direction of the axis line Cc, is located at a position for the end Tc (metalworking portion) of the welding tool 20 to be positioned on the axis line R of the spindle 4 when the welding tool 20 is attached to the metalworking shaft 14. Accordingly, irrespective of the direction of the spindle 4 and the direction Di of the welding tool 20, the end Tc (metalworking portion) of the welding tool 20 is located on the axis line R of the spindle 4. The metalworking position on the workpiece 9 can thus be easily set irrespective of the direction Di of the welding tool 20 and, for instance, a control program can be also easily made.

Second Example Embodiment

Figure 5:
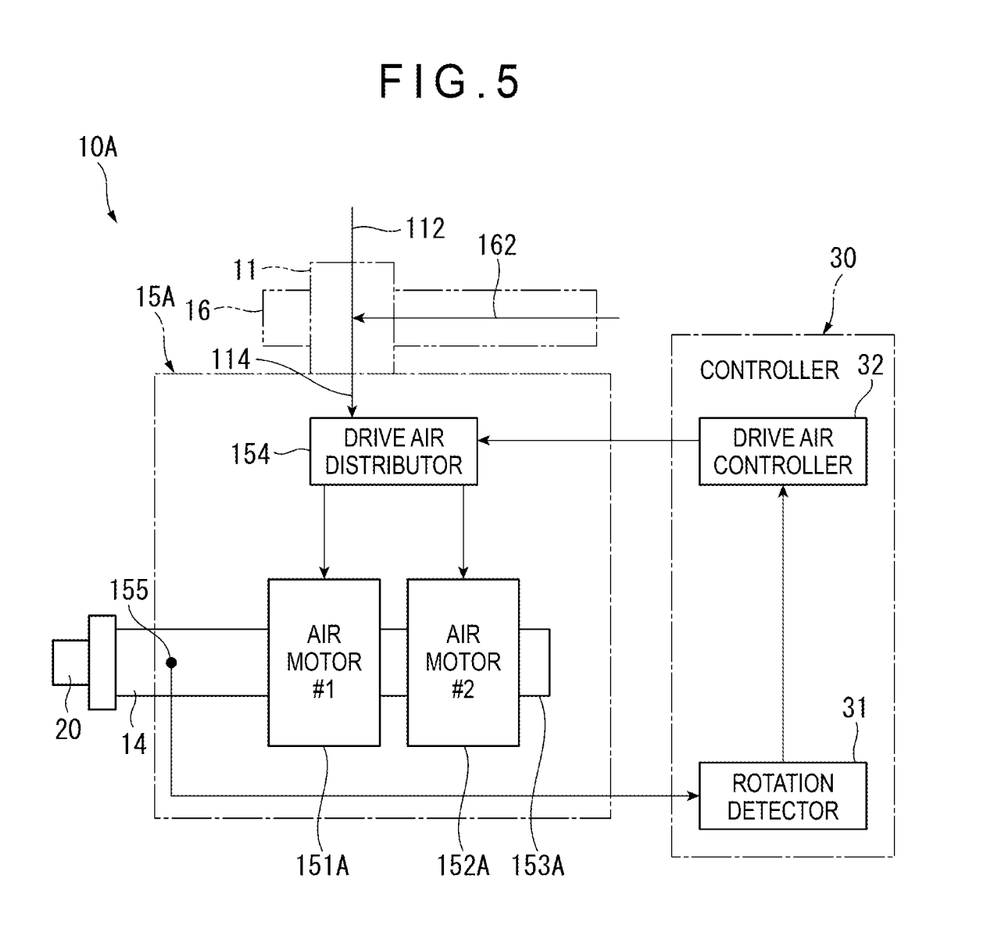
FIG. 5 is an illustration depicting a rotation drive unit and a controller for a friction stir welding attachment of a second example embodiment of the invention.

FIG. 5 depicts a second example embodiment of the invention.

A friction stir welding attachment 10A of the present example embodiment has substantially the same arrangement as that in the above-described first example embodiment except for the structure of the rotation drive unit 15. Accordingly, duplicated description for the same component(s) will be omitted and different part(s) will only be described below.

As depicted in FIG. 5, a rotation drive unit 15A of the present example embodiment includes a plurality of air motors 151A, 152A, the drive air distributor 154, and the rotation sensor 155 as in the above-described first example embodiment.

The air motors 151, 152 in the above-described first example embodiment are provided in parallel, where the rotations of the air motors 151, 152 are combined by the gear transmission mechanism 153. In contrast, the air motors 151A, 152A are arranged in series. The metalworking shaft 14 extends to sequentially penetrate through the centers of the air motors 151A, 152A, where the torques of the air motors 151A, 152A are combined by an extension of the metalworking shaft 14 to be transmitted to the metalworking shaft 14. A transmission mechanism 153A is provided by the extension of the metalworking shaft 14.

The same advantages as those of the above-described first example embodiment can be achieved by the friction stir welding attachment 10A, the friction stir welding head 19, and the friction stir welding machine 1 according to the present example embodiment.

Third Example Embodiment

Figure 6:
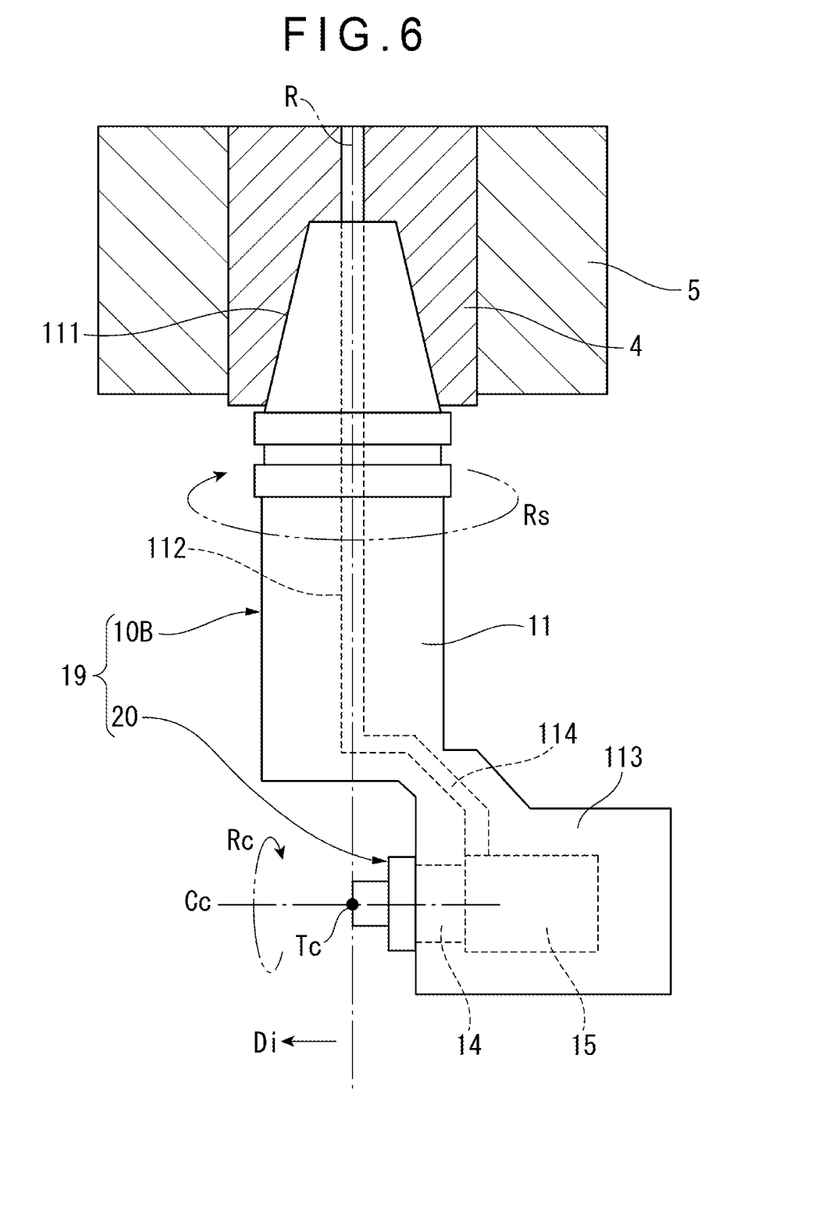
FIG. 6 is an illustration depicting a friction stir welding attachment of a third example embodiment of the invention.

FIG. 6 depicts a third example embodiment of the invention.

A friction stir welding attachment 10B of the present example embodiment has substantially the same arrangement as that in the above-described first example embodiment except for omitting the fixing portion 16. Accordingly, duplicated description for the same component(s) will be omitted and different part(s) will only be described below.

As depicted in FIG. 6, the friction stir welding attachment 10B of the present example embodiment has no fixing portion 16 as in the above-described first example embodiment, where the drive air supplied to the rotation drive unit 15 is provided solely by the center through air through the center through hole 112. Accordingly, the external air through the external air channel 162 as in the above-described first example embodiment cannot be used in the present example embodiment. However, the structure can be simplified by omitting the fixing portion 16 while, in other respects, achieving the same advantages as in the first example embodiment.

Fourth Example Embodiment

Figure 7:
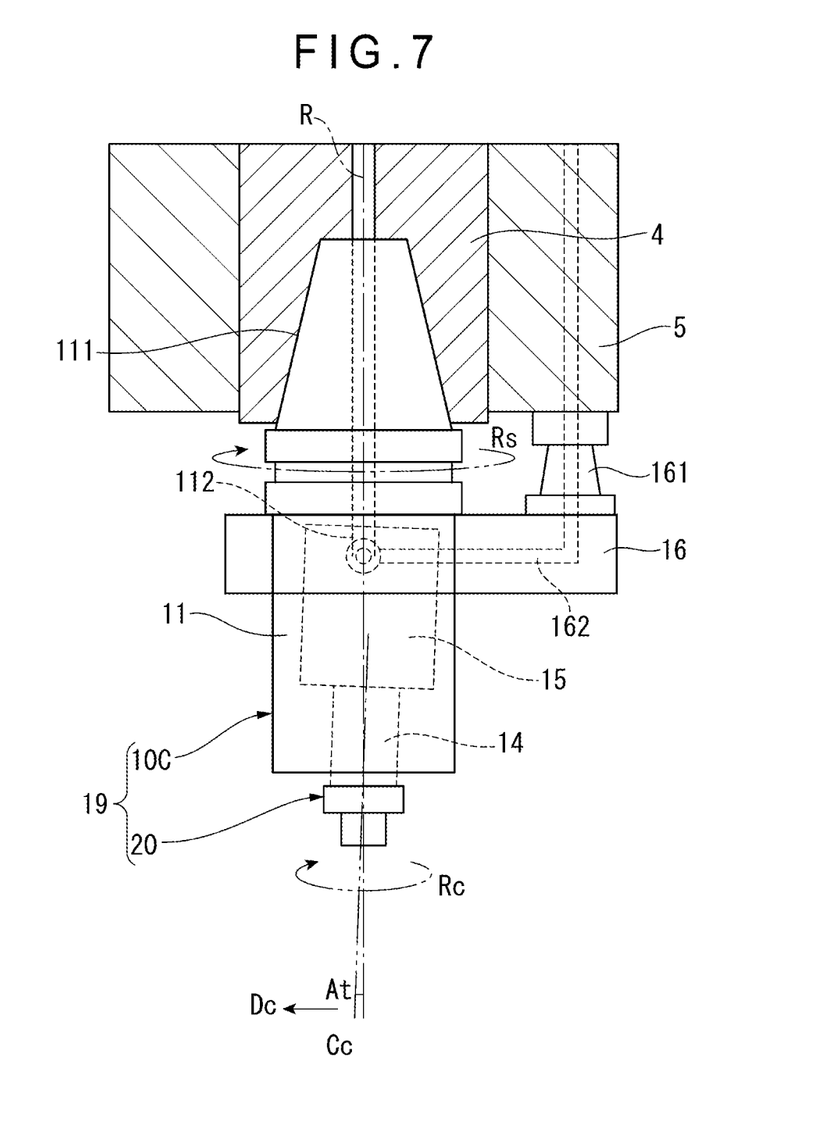
FIG. 7 is an illustration depicting a friction stir welding attachment of a fourth example embodiment of the invention.

FIG. 7 depicts a fourth example embodiment of the invention.

A friction stir welding attachment 10C of the present example embodiment has substantially the same arrangement as that in the above-described first example embodiment except that the body 11 has no extension part 113 and that the metalworking shaft 14 and the rotation drive unit 15 face downward and are substantially coaxial with the spindle 4. Accordingly, duplicated description for the same component(s) will be omitted and different part(s) will only be described below.

As depicted in FIG. 7, the metalworking shaft 14 the rotation drive unit 15 are provided at a lower end of the body 11 in a manner facing downward. In the above arrangement, the metalworking shaft 14 and the rotation drive unit 15 are slanted with respect to the axis line R of the spindle 4.

The axis line Cc of the rotation center of the metalworking shaft 14 is slanted by an angle At (approximately 0 to 5 degrees) with respect to the body 11. A side, toward which a distal end of the axis line Cc of the friction stir welding attachment 10C is slanted, defines a front side Dc.

In the friction stir welding attachment 10C of the present example embodiment, the metalworking shaft 14 and the welding tool 20 are rotated by the rotation drive unit 15 (rotary operation Rc) to perform friction stir welding on the workpiece 9 by the welding tool 20.

At this time, the direction of the front side Dc of the friction stir welding attachment 10C can be changed depending on the movement direction of the welding tool 20 on the workpiece 9 by rotating the body 11 (rotary operation Rs) using the spindle 4.

According to the present example embodiment, the same advantages as those of the above-described first example embodiment can be achieved. In addition, the angle At of the inclination of the welding tool 20 can be appropriately adjusted depending on the movement direction of the welding tool 20 to perform stable friction stir welding on the workpiece 9.

Fifth Example Embodiment

Figure 8:
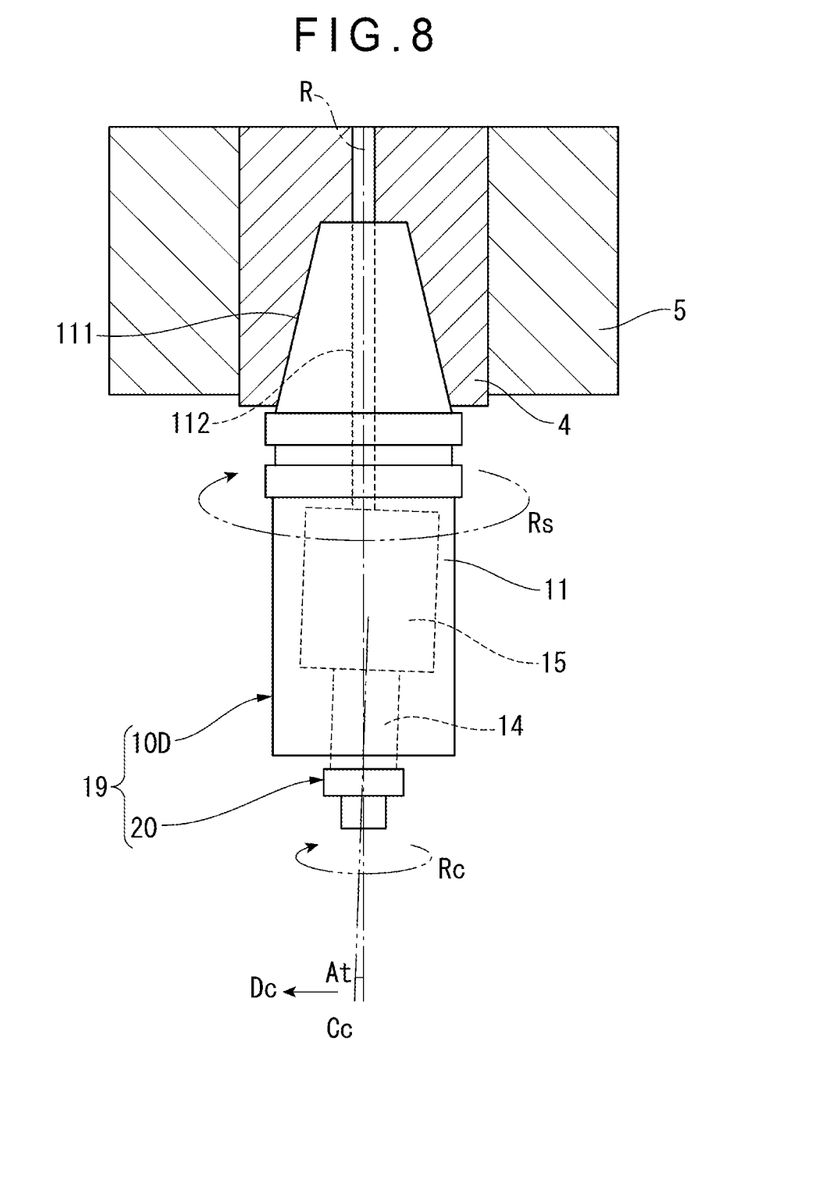
FIG. 8 is an illustration depicting a friction stir welding attachment of a fifth example embodiment of the invention.

FIG. 8 depicts a fifth example embodiment of the invention.

A friction stir welding attachment 10D of the present example embodiment has substantially the same arrangement as that in the above-described first example embodiment except that the fixing portion 16 is omitted, the body 11 has no extension part 113, and the metalworking shaft 14 and the rotation drive unit 15 are substantially coaxial with the spindle 4 and face downward. Accordingly, duplicated description for the same component(s) will be omitted and different part(s) will only be described below.

In the present example embodiment, the structure can be simplified by omitting the fixing portion 16 as in the above-described third example embodiment while, in other respects, achieving the same advantages as in the first example embodiment. Further, as in the above-described fourth example embodiment, the angle At of the inclination of the welding tool 20 is appropriately adjustable depending on the movement direction of the welding tool 20 to perform stable friction stir welding on the workpiece 9.

OTHER EXAMPLE EMBODIMENT(S)

It should be noted that the invention is not limited to the above-described example embodiments but includes modifications and the like as long as such modifications and the like are compatible with an object of the invention.

The number of the air motors provided to the rotation drive unit 15 in parallel (see FIG. 3) or to the rotation drive unit 15A in series (see FIG. 5), which is two (air motors 151, 152 or air motors 151A, 152A) in the above-described example embodiments, is optionally three or more. When the air motors are provided in parallel as in the rotation drive unit 15, it is only necessary for the air motors to be evenly arranged around the center gear 156 depicted in FIG. 4. When the air motors are provided in series as in the rotation drive unit 15A, it is only necessary to simply add the air motors.

In the above-described first example embodiment, second example embodiment, and fourth example embodiment, the external air is inputted through the fixing portion 16 to be combined with the center through air through the center through hole 112. However, the drive air for driving the rotation drive units 15, 15A are optionally provided solely by the external air through the fixing portion 16. For instance, even when the machine tool 2 has no mechanism for supplying the center through air, the friction stir welding attachments 10, 10A, 10C in the first example embodiment, second example embodiment, and fourth example embodiment can be used only by adding a component for supplying the external air in the spindle head 5.

Further, the center through hole 112 is optionally omitted in the friction stir welding attachments 10, 10A, 10C in the first example embodiment, second example embodiment, and fourth example embodiment, so that the rotation drive units 15, 15A are driven solely by the external air through the fixing portion 16.

The balance of the drive air supplied to the air motors 151, 152 (or the air motors 151A, 152A), which is adjusted under external control by the drive air distributor 154 in the above-described example embodiments, is optionally adjusted using a simple branched pipe, where the drive air distributor 154 is omitted.

The rotation sensor 155, which is configured to detect the rotation state of the metalworking shaft 14 in the above-described example embodiments, is optionally configured to detect the rotation of any one of shafts of each of the air motors 151, 152. The rotation sensor 155 is specifically selectable from among any existing devices such as rotary encoders, angle sensors, and rotation counters.

It should be noted that it is not necessary to detect the rotation by the rotation sensor 155 but the rotation sensor 155 is optionally omitted when, for instance, a unit for externally detecting the rotation of the welding tool 20 in a non-contact manner is available.

In the above-described first to third example embodiments, the metalworking shaft 14 is located on the axis line aligned with the direction intersecting the axis line R of the spindle 4 and the end Tc (metalworking portion) of the welding tool 20 is located on the axis line R of the spindle 4 when the welding tool 20 is attached to the metalworking shaft 14. However, the welding tool 20 is optionally located at a position different from the position in the first to third example embodiments. However, the advantage of the example embodiments, where, irrespective of the direction of the spindle 4 and the direction Di of the welding tool 20, the end Tc (metalworking portion) of the welding tool 20 is constantly located on the axis line R of the spindle 4, cannot be achieved.

The invention is applicable to a friction stir welding attachment, a friction stir welding head, and a friction stir welding machine.

LIST OF REFERENCE NUMERALS

1 . . . friction stir welding machine, 2 . . . machine tool, 3 . . . table, 4 . . . spindle, 5 . . . spindle head, 6 . . . moving mechanism, 7 . . . bed, 8 . . . cover, 9 . . . workpiece, 10, 10A, 10B, 10C, 10D . . . friction stir welding attachment, 11 . . . body, 111 . . . tapered shank, 112 . . . center through hole, 113 . . . extension part, 114 . . . extension air channel, 14 . . . metalworking shaft, 15, 15A . . . rotation drive unit, 151, 152, 151A, 152A . . . air motor, 153, 153A . . . transmission mechanism, 154 . . . drive air distributor, 155 . . . rotation sensor, 156 . . . center gear, 157, 158 . . . motor gear, 16 . . . fixing portion, 161 . . . sub shank, 162 . . . external air channel, 19 . . . friction stir welding head, 20 . . . welding tool, 30 . . . controller, 31 . . . rotation detector, 32 . . . drive air controller, 61 . . . guide bar, 62 . . . slider, At . . . angle, Cc . . . axis line, Dc . . . front side, Di . . . direction, R . . . axis line, Rc . . . rotary operation, Rs . . . rotary operation, Tc . . . end

The invention claimed is:

1. A friction stir welding attachment comprising:
a body configured to be attached to a spindle supported by a spindle head of a machine tool;
a metalworking shaft rotatably supported by the body, wherein a welding tool is attachable to the metalworking shaft;
a plurality of air motors provided in the body; and
a transmission mechanism configured to transmit a rotation of each of the plurality of air motors to the metalworking shaft.

2. The friction stir welding attachment according to claim 1,
wherein:
the air motors are symmetrically located with respect to the metalworking shaft, and the transmission mechanism comprises a center gear connected with the metalworking shaft and a plurality of motor gears connected with the air motors and engaged with an outer circumference of the center gear.

3. The friction stir welding attachment according to claim 1, further comprising:
a drive air distributor provided in the body and configured to distribute a drive air from outside the machine tool to the plurality of air motors, the plurality of air motors being configured to be rotated by the drive air, a flow rate of the drive air being adjustable by the drive air distributor in response to an external signal.

4. The friction stir welding attachment according to claim 3, wherein the body has a center through hole extending along an axial center thereof, and the drive air comprises center through air supplied into the center through hole from the spindle.

5. The friction stir welding attachment according to claim 3, further comprising:
a fixing portion rotatably provided around an outer circumference of the body, the fixing portion being connectable to the spindle head, wherein the drive air comprises an external air supplied through the spindle head and the fixing portion.

6. The friction stir welding attachment according to claim 1, further comprising:
a rotation sensor configured to detect a rotation state of the metalworking shaft or the air motors.

7. The friction stir welding attachment according to claim 1, wherein the metalworking shaft is aligned with a direction intersecting an axis line of the spindle.

8. The friction stir welding attachment according to claim 7, wherein the metalworking shaft, which is aligned with the direction intersecting the axis line of the spindle, is arranged so that a metalworking portion of the welding tool is located on the axis line of the spindle when the welding tool is attached to the metalworking shaft.

9. The friction stir welding attachment according to claim 1, wherein the metalworking shaft is coaxial with an axis line of the spindle.

10. A friction stir welding head comprising:
    the friction stir welding attachment according to claim 1; and
    the welding tool attached to the friction stir welding attachment.

11. A friction stir welding machine comprising:
    the friction stir welding attachment according to claim 1;
    the welding tool attached to the friction stir welding attachment; and
    the machine tool attached to the friction stir welding attachment.

12. The friction stir welding attachment according to claim 2, further comprising:
    a drive air distributor provided in the body and configured to distribute a drive air from outside the machine tool to the plurality of air motors, the plurality of air motors being configured to be rotated by the drive air, a flow rate of the drive air being adjustable by the drive air distributor in response to an external signal.

13. The friction stir welding attachment according to claim 2, further comprising:
    a rotation sensor configured to detect a rotation state of the metalworking shaft or the air motors.

14. The friction stir welding attachment according to claim 3, further comprising:
    a rotation sensor configured to detect a rotation state of the metalworking shaft or the air motors.

15. The friction stir welding attachment according to claim 5, further comprising:
    a rotation sensor configured to detect a rotation state of the metalworking shaft or the air motors.

16. The friction stir welding attachment according to claim 12, further comprising:
    a rotation sensor configured to detect a rotation state of the metalworking shaft or the air motors.

17. A friction stir welding head comprising:
    the friction stir welding attachment according to claim 2; and
    the welding tool attached to the friction stir welding attachment.

18. A friction stir welding machine comprising:
    the friction stir welding attachment according to claim 2;
    the welding tool attached to the friction stir welding attachment; and
    the machine tool attached to the friction stir welding attachment.

19. A friction stir welding head comprising:
    the friction stir welding attachment according to claim 3; and
    the welding tool attached to the friction stir welding attachment.

20. A friction stir welding machine comprising:
    the friction stir welding attachment according to claim 3;
    the welding tool attached to the friction stir welding attachment; and
    the machine tool attached to the friction stir welding attachment.

* * * * *